(12) United States Patent
Liao

(10) Patent No.: US 10,696,007 B2
(45) Date of Patent: Jun. 30, 2020

(54) MOBILE PHONE CURVED FILM, PRODUCTION METHOD THEREOF, AND CURVED ATTACHMENT PLATE

(71) Applicant: YONGDELI SILICONE RUBBER TECHNOLOGY (SHENZHEN) CO., LTD, Shenzhen, Guangdong (CN)

(72) Inventor: Denan Liao, Guangdong (CN)

(73) Assignee: YONGDELI SILICONE RUBBER TECHNOLOGY (SHENZHEN) CO., LTD, Shenzhen, Guangdong (CN)

( * ) Notice: Subject to any disclaimer, the term of this patent is extended or adjusted under 35 U.S.C. 154(b) by 253 days.

(21) Appl. No.: 15/739,766

(22) PCT Filed: Nov. 9, 2017

(86) PCT No.: PCT/CN2017/110225
§ 371 (c)(1),
(2) Date: Dec. 25, 2017

(87) PCT Pub. No.: WO2019/090612
PCT Pub. Date: May 16, 2019

(65) Prior Publication Data
US 2019/0389169 A1    Dec. 26, 2019

(51) Int. Cl.
*B32B 3/02* (2006.01)
*B32B 7/12* (2006.01)
*B32B 17/06* (2006.01)
*B32B 37/12* (2006.01)

(52) U.S. Cl.
CPC .............. *B32B 3/02* (2013.01); *B32B 7/12* (2013.01); *B32B 17/06* (2013.01); *B32B 37/1284* (2013.01); *B32B 2457/00* (2013.01)

(58) Field of Classification Search
CPC ........................................ B32B 3/02
USPC ................................................ 428/81
See application file for complete search history.

(56) References Cited

U.S. PATENT DOCUMENTS 9,198,317 B2 * 11/2015 Sawadski ............... H01Q 1/243

* cited by examiner

*Primary Examiner* — Brent T O'Hern

(57) ABSTRACT

The present application discloses a curved attachment plate dedicated for mobile phone curved film, wherein the curved attachment plate comprises a planar region, a left bent region located at a left side of the planar region, and a right bent region located at a right side of the planar region, the left bent region is arranged corresponding to left sides of the curved toughened glass and curved explosion-proof film of the mobile phone curved film, and the right bent region is arranged corresponding to right sides of the curved toughened glass and curved explosion-proof film of the mobile phone curved film. The technical solution of the present application has the advantage of high user experience.

4 Claims, 3 Drawing Sheets

MOBILE PHONE CURVED FILM, PRODUCTION METHOD THEREOF, AND CURVED ATTACHMENT PLATE

TECHNICAL FIELD

The present application relates to the fields of machinery and mobile phone accessories, in particular, to a mobile phone curved film, the production method of the mobile phone curved film, and a curved attachment plate.

BACKGROUND

Mobile phones are most popular electronic equipment in people's daily lives. In particular, the appearance of smart phones with touch screens changes the usage habits of people for mobile phones. For mobile phones with touch screens, the touch screen is the most frequently used part of the mobile phone. As the current mobile phones get larger and larger in size, the screens also get bigger and bigger. Therefore, in order to protect the screen of mobile phones, screen protector film appears, which can effectively protect the screens of mobile phones.

With the development of the screen of mobile phones, the screen of mobile phones develops from a flat display screen to a curved display screen. In order to protect the curved display screen, curved screen protector film appears too, however, the curved screen protector film enables ease of deposition of an adhesive layer, so that the curved screen protector film cannot adhere onto the screen due to too much adhesive on this film. Thus, user experience is poor.

SUMMARY

The present application aims to provide a mobile phone curved film, the production method of the mobile phone curved film, and a curved attachment plate. In particular, the embodiments of the present application mainly solve the problem of poor user experience in existing technologies.

In order to solve the above technical problem, the embodiments of the present application provide a mobile phone curved film, which from top to bottom includes in sequence a curved toughened glass, a curved explosion-proof film, an adhesive layer and a curved attachment plate.

In particular, the curved attachment plate includes a planar region, a left bent region located at the left side of the planar region, and a right bent region located at the right side of the planar region; the left bent region is arranged corresponding to left sides of the curved toughened glass and curved explosion-proof film, and the right bent region is arranged corresponding to right sides of the curved toughened glass and curved explosion-proof film.

Preferably, an arched region is arranged at the upper side of the curved attachment plate, and the arched region is arranged corresponding to special-shaped regions of the curved toughened glass and curved explosion-proof film.

Preferably, the adhesive layer is AB adhesive.

Preferably, the adhesive layer is formed by rolling an adhesive roller on the lower surface of the curved explosion-proof film; wherein the gap between the central axis of the adhesive roller and the planar region of the lower surface of the curved explosion-proof film may be a constant C; the gap between the central axis of the adhesive roller and the home region of the lower surface of the curved explosion-proof film is L1, and $L1=C+lg(w-m+1)$, wherein m is the distance from the point m of the home region in contact with the edge of the adhesive roller to the bottom line of the curved explosion-proof film, and w is the maximum value of the home region in the direction of X axis; the gap between the central axis of the adhesive roller and the special-shaped region of the lower surface of the curved explosion-proof film is L2, and $L2=C+lg(s-n+a)$, wherein n may be a distance from the point n of the special-shaped region in contact with the edge of adhesive roller to the top line of the curved explosion-proof film, and s is a maximum value of the special-shaped region in the direction of X axis.

According to the second aspect of the present application, a curved attachment plate dedicated for the mobile phone curved film is provided.

The curved attachment plate includes: a planar region, a left bent region located at the left side of the planar region, and a right bent region located at the right side of the planar region, wherein the left bent region is arranged corresponding to left sides of the curved toughened glass and curved explosion-proof film of the mobile phone curved film, and the right bent region is arranged corresponding to right sides of the curved toughened glass and curved explosion-proof film of the mobile phone curved film.

Preferably, an arched region is arranged at the upper side of the curved attachment plate, and the arched region is arranged corresponding to special-shaped regions of the curved toughened glass and curved explosion-proof film of the mobile phone curved film.

According to a third aspect of the present application, a method for manufacturing a mobile phone curved film is provided, which includes the steps as follows:

A curved toughened glass and a curved explosion-proof film are bonded together and fixed, and an adhesive roller is employed to roll on the lower surface of the curved explosion-proof film to produce an adhesive layer, wherein the gap between the central axis of the adhesive roller and the planar region of the lower surface of the curved explosion-proof film may be a constant C; the gap between the central axis of the adhesive roller and the home region of the lower surface of the curved explosion-proof film is L1, and $L1=C+lg(w-m+1)$, wherein m is the distance from the point m of the home region in contact with the edge of adhesive roller to the bottom line of the curved explosion-proof film, and w may be a maximum value of the home region in the direction of X axis; the gap between the central axis of the adhesive roller and the special-shaped region of the lower surface of the curved explosion-proof film is L2, and $L2=C+lg(s-n+1)$, where n may be the distance from the point n of the special-shaped region in contact with the edge of the adhesive roller to the top line of the curved explosion-proof film, and s is the maximum value of the special-shaped region in the direction of X axis.

The curved attachment plate is bonded with the lower surface of the curved explosion-proof film through the adhesive layer.

Preferably, the curved attachment plate includes: a planar region, a left bent region located at a left side of the planar region, and a right bent region located at a right side of the planar region, wherein the left bent region is arranged corresponding to left sides of the curved toughened glass and curved explosion-proof film, and the right bent region is arranged corresponding to right sides of the curved toughened glass and curved explosion-proof film.

Preferably, an arched region is arranged at the upper side of the curved attachment plate, and the arched region is arranged corresponding to special-shaped regions of the curved toughened glass and curved explosion-proof film.

Preferably, the adhesive layer is AB adhesive.

According to the technical solution provided by the present application, the curved attachment plate is arranged, whose left side and right side are provided with the left bent region and the right bent region respectively, accordingly, if the adhesive layer has redundant adhesive at the curved portion of the curved film, this redundant adhesive will flow to the left bent region and the right bent region, thereby avoiding adhesive overflowing. The adhesive layer has better leveling and curing properties, guaranteeing that the adhesive layer and the curved attachment plate are stably shaped and guaranteeing that the adhesive layer matches with and fits the display screen of a real mobile phone and the air can be easily exhausted.

BRIEF DESCRIPTION OF THE DRAWINGS

To better describe the technical solution in the embodiments of the present application, accompanying drawings needed in the implementation are simply illustrated below; obviously, accompanying drawings described hereinafter illustrate some implementations of the present application; for the ordinary skill in the field, other accompanying drawings may be obtained according to these accompanying drawings without creative work.

DESCRIPTION OF THE EMBODIMENTS

A clear and complete description as below is provided to the technical scheme in the embodiments of the present application in conjunction with the accompanying drawings in the embodiments of the present application. It should be appreciated that the embodiments described hereinafter are simply part embodiments of the present application, but all the embodiments. All other embodiments obtained by the ordinary skill in the art based on the embodiments in the present application without creative work are intended to be included in the scope of protection of the present application.

In the description of the embodiments of the present application, it should be appreciated that directional or positional relations indicated by terms such as "thickness", "left", "right", "up", "down", etc are directional or positional relations shown based on the drawings, merely to conveniently describe the present application and simplify the description, but not to indicate or imply the designated device or element to be constructed and operated in a specific position or in a specific direction; therefore, the used directional terms cannot be understood as a restriction to the present application.

Figure 1:
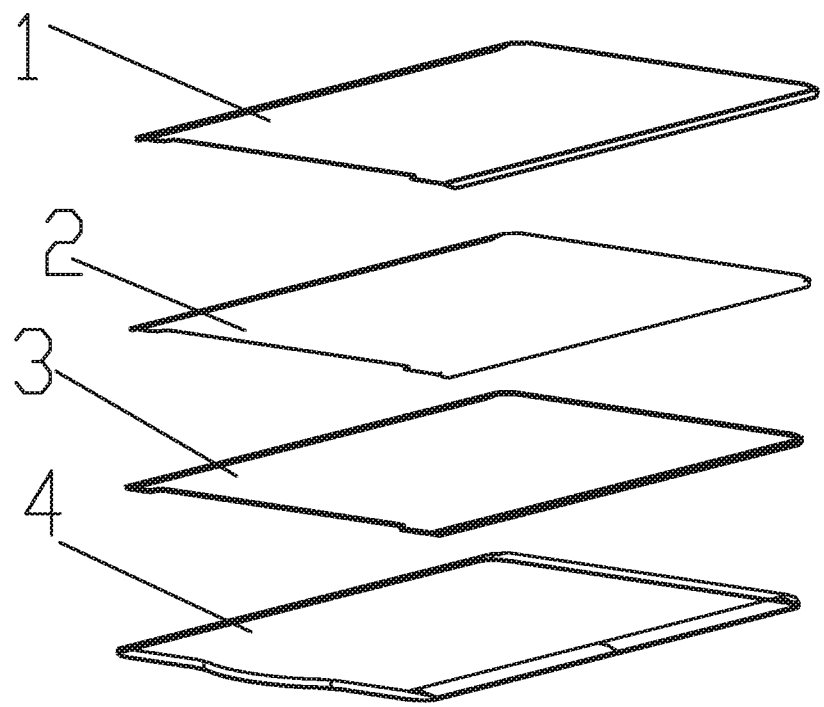
FIG. 1 is a structure diagram of a mobile phone curved film provided by the present application.

Refer to FIG. 1, which shows a structure diagram of a mobile phone curved film. As shown in FIG. 1, the mobile phone curved film includes from top to bottom in sequence: a curved toughened glass 1, a curved explosion-proof film 2, an adhesive layer 3 and a curved attachment plate 4.

Figure 2:
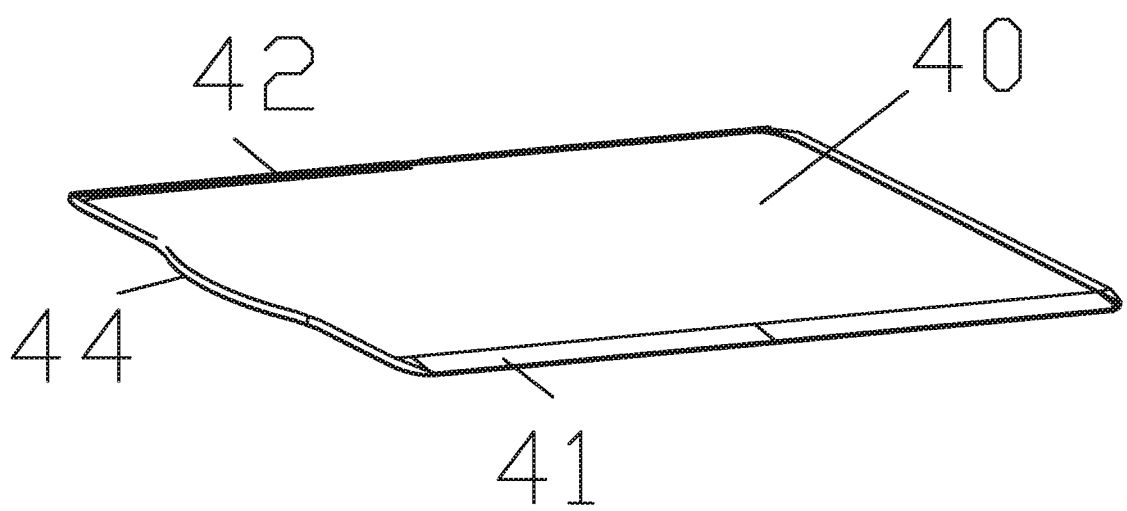
FIG. 2 is a structure diagram of a curved attachment plate provided by the present application.
Figure 3:
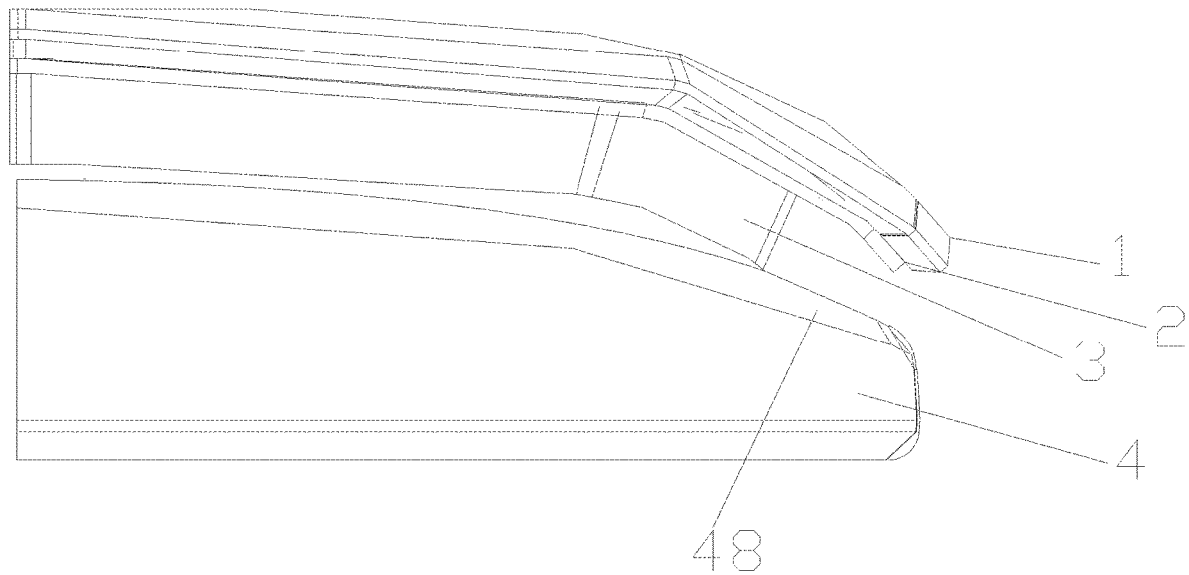
FIG. 3 is an enlarged right view of a cross section of a curved film provided by the present application.

In particular, as shown in FIG. 2, the curved attachment plate 4 includes a planar region 40, a left bent region 41 located at the left side of the planar region, and a right bent region 42 located at the right side of the planar region; the left bent region 41 is arranged corresponding to left sides of the curved toughened glass 1 and curved explosion-proof film 2, and the right bent region 42 is arranged corresponding to right sides of the curved toughened glass 1 and curved explosion-proof film 2 (as shown in FIG. 3).

According to the technical solution provided by the present application, the curved attachment plate is arranged, whose left side and right side are provided with the left bent region and the right bent region respectively. Thus, if the adhesive layer has redundant adhesive at the curved portion of the curved film, the redundant adhesive will flow to the left bent region and the right bent region 48, thereby avoiding adhesive overflowing. The adhesive layer has better leveling and curing properties, guaranteeing that the adhesive layer and the curved attachment plate are stably shaped and guaranteeing that the adhesive layer matches with and fits the display screen of a real mobile phone and air is easily exhausted.

Preferably, an arched region 44 is arranged at an upper end of the curved attachment plate 4, and the arched region 44 is arranged corresponding to special-shaped regions (commonly known as bangs) of the curved toughened glass 1 and curved explosion-proof film 2. The arrangement of the arched region 44 facilitates the adhesive rolling of the adhesive layer. As the bangs belong to a cavity structure, it is necessary to ensure that there is adhesive at the upper side of the adhesive layer but the adhesive at the position of the bangs mustn't be excessive; therefore, the arrangement of the arched portion can remain the excessive adhesive at the position of the bangs in the arched portion.

Preferably, the adhesive layer specifically may be AB adhesive, and, of course, may be other adhesives in actual applications.

Figure 4:
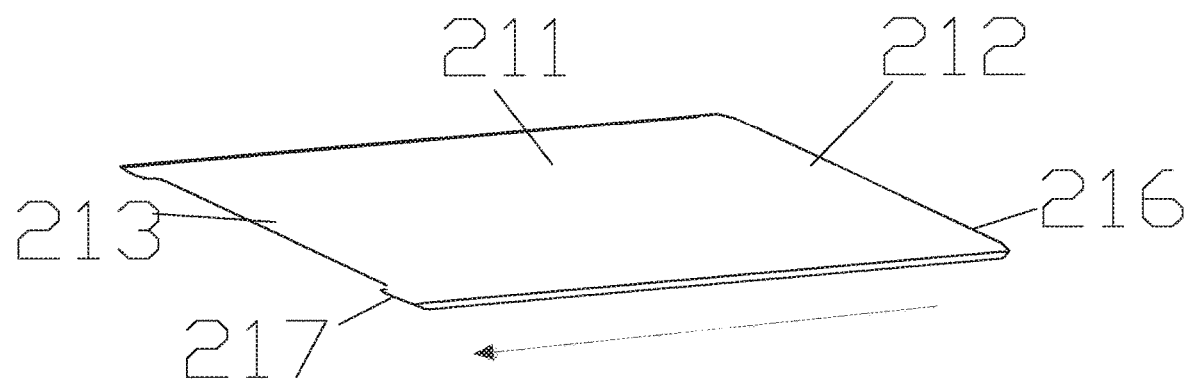
FIG. 4 is a diagram of a curved explosion-proof film provided by the present application with illustrating designators.

Preferably, the adhesive layer is formed by rolling an adhesive roller on a lower surface of the curved explosion-proof film 2 (along the direction as shown in FIG. 4); the distance between a central axis of the adhesive roller and a planar region 211 of the lower surface of the curved explosion-proof film 2 may be a constant C; the distance between the central axis of the adhesive roller and a home region 212 of the lower surface of the curved explosion-proof film 2 is $L1=C+\lg(w-m+1)$, wherein m is a distance from the point m of the home region in contact with the edge of the adhesive roller to a bottom line of the curved explosion-proof film 2, and w is a maximum value of the home region in the direction of X axis; the distance between the central axis of the adhesive roller and the special-shaped region 213 of the lower surface of the curved explosion-proof film 2 is L2, and $L2=C+\lg(s-n+1)$, wherein n may be a distance from the point n of the special-shaped region in contact with the edge of the adhesive roller to a top line of the curved explosion-proof film 2, and s is a maximum value of the special-shaped region in the direction of X axis.

Figure 5:
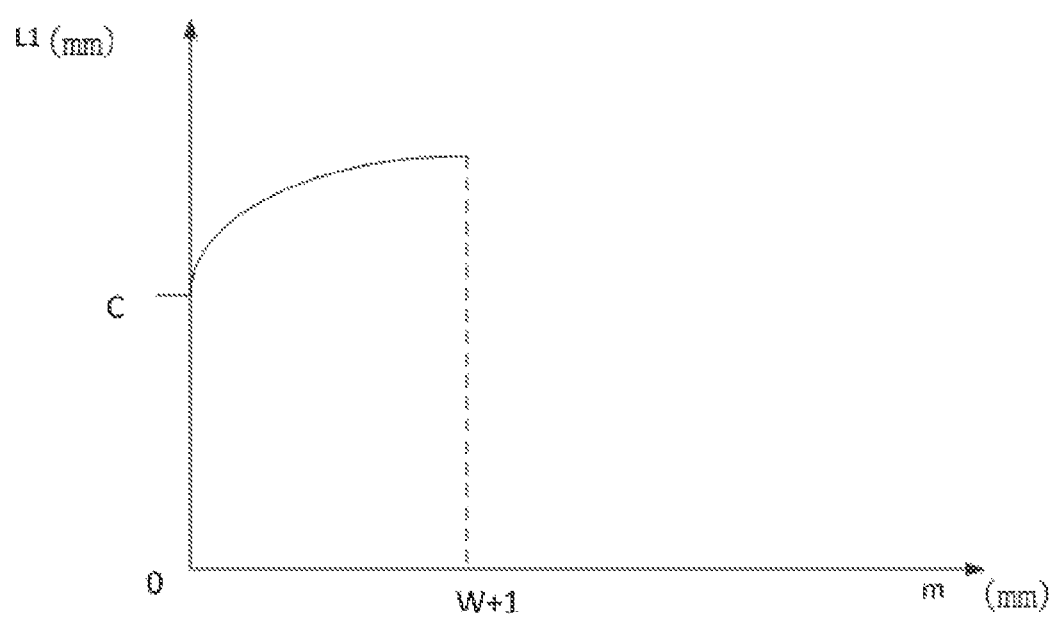
FIG. 5 is a curve graph of separation of the present application.

In particular, with respect to the special-shaped region or home region, the gap between the central axis of the adhesive roller and the curved explosion-proof film 2 is set to the above function in order to avoid the condition that adhesive drawing appears on the adhesive layer of the special-shaped region or home region. Experimental analysis shows that, if the adhesive roller is separated suddenly from the curved explosion-proof film 2 when the adhesive layer is being formed (that is, the gap changes directly from C to the separation, namely to infinity), adhesive drawing appears on the special-shaped region or home region because the special-shaped region or home region is the border region. Experimental analysis also shows that the adhesive drawing may be avoided if the gap is increased gradually from C to the separation and that the resulting adhesive layer will be more uniform, and easier to adhere and will not generate air bubbles. Experiments show that the adhesive layer has the optimal effect when the gap is C+lg(w−m+1) (the curve graph is as shown in FIG. 5).

The present application further provides a production method for the mobile phone curved film. The method may be completed by a curved film equipment and specifically may include the steps as follows.

A curved toughened glass and a curved explosion-proof film are bonded together and fixed, and then an adhesive roller is controlled to roll on a lower surface of the curved explosion-proof film 2 to produce an adhesive layer (along the direction as shown in FIG. 4), wherein the gap between a central axis of the adhesive roller and a planar region 211 of the lower surface of the curved explosion-proof film 2 may be a constant C; the gap between the central axis of the adhesive roller and the home region 212 of the lower surface of the curved explosion-proof film 2 is L1, and L1=C+lg(w−m+1), wherein m is a distance from the point m of the home region in contact with the edge of the adhesive roller to a bottom line 216 of the curved explosion-proof film 2, and w is a maximum value of the home region in the direction of X axis; the gap between the central axis of the adhesive roller and the irregular shaped region 213 of the lower surface of the curved explosion-proof film 2 is L2, and L2=C+lg(s−n+1), wherein n may be a distance from the point n of the irregular shaped region in contact with the edge of the adhesive roller to a top line 217 of the curved explosion-proof film 2, and s is a maximum value of the irregular shaped region in the direction of X axis (the direction indicated by the arrow as shown in FIG. 4).

The curved attachment plate is bonded with the lower surface of the curved explosion-proof film through the adhesive layer.

Preferably, the curved attachment plate includes: a planar region, a left bent region located at the left side of the planar region, and a right bent region located at the right side of the planar region, wherein the left bent region is arranged corresponding to left sides of the curved toughened glass and curved explosion-proof film, and the right bent region is arranged corresponding to right sides of the curved toughened glass and curved explosion-proof film.

Preferably, an arched region is arranged at the upper side of the curved attachment plate, and the arched region is arranged corresponding to special-shaped regions of the curved toughened glass and curved explosion-proof film.

Preferably, the adhesive layer is AB adhesive.

The above are specific implementations of the embodiments of the present application. It should be noted that, for the ordinary skill in this art, multiple improvements and modifications may be made without departing from the principle of the embodiments of the present application, and these improvements and modifications shall fall into the scope of protection of the present application.

What is claimed is:

1. A method for producing a mobile phone curved film, which comprises:
a curved toughened glass and a curved explosion-proof film are bonded together and fixed, and an adhesive roller is employed to roll on a lower surface of the curved explosion-proof film to produce an adhesive layer, wherein a distance between a central axis of the adhesive roller and a planar region of a lower surface of the curved explosion-proof film is a constant C; a distance between a central axis of the adhesive roller and a home region of a lower surface of the curved explosion-proof film is L1, and $L1=C+\log_{10}(w-m+1)$, wherein m is a distance from a point m of the home region in contact with an edge of the adhesive roller to a bottom line of the curved explosion-proof film, and w is a maximum value of the home region in X axis direction; a distance between a central axis of the adhesive roller and a special-shaped region of a lower surface of the curved explosion-proof film is L2, and $L2=C+\log_{10}(s-n+1)$, wherein n is a distance from a point n of the special-shaped region in contact with an edge of the adhesive roller to a top line of the curved explosion-proof film, and s is a maximum value of the special-shaped region in X axis direction,
the curved attachment plate is bonded with the lower surface of the curved explosion-proof film through the adhesive layer.

2. The method of claim 1, wherein the curved attachment plate comprises:
a planar region, a left bent region located at a left side of the planar region, and a right bent region located at a right side of the planar region, wherein the left bent region is arranged corresponding to left sides of the curved toughened glass and curved explosion-proof film, and the right bent region is arranged corresponding to right sides of the curved toughened glass and curved explosion-proof film.

3. The method of claim 1, wherein an arched region is arranged at an upper side of the curved attachment plate, and the arched region is arranged corresponding to special-shaped regions of the curved toughened glass and curved explosion-proof film.

4. The method of claim 1, wherein the adhesive layer is made of AB adhesive.

* * * * *